Aug. 31, 1937.  M. M. BRODERSEN  2,091,427
ROOTER
Filed Jan. 28, 1935   3 Sheets-Sheet 3

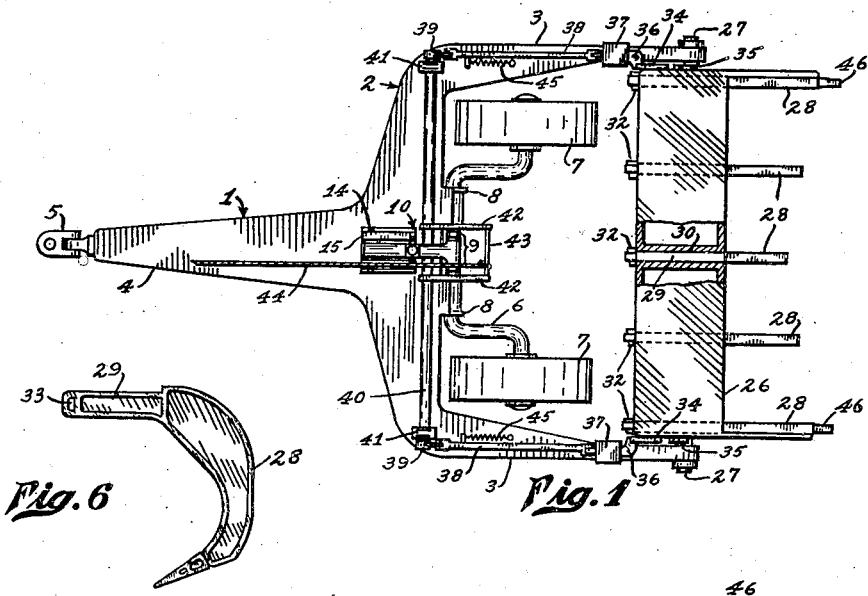

Inventor
Max M. Brodersen

Patented Aug. 31, 1937

2,091,427

UNITED STATES PATENT OFFICE 2,091,427

ROOTER

Max M. Brodersen, Alhambra, Calif., assignor to
L. O. Bird, Glendale, Calif.

Application January 28, 1935, Serial No. 3,835

10 Claims. (Cl. 97—50)

This invention relates to rotary ground rooting means and is an improvement on the type of earth working implement shown and described in my c iginal patent, No. 1,947,640 dated February 20, 1934, Serial No. 618,263 filed June 20, 1932 and now reissued on November 6, 1934 as Re. 19,360 on an application for reissue filed August 13, 1934, Serial No. 739,519½.

The particular object of this invention is the provision of a rooting device in which the revolving head carrying the digging teeth is securely latched in the operative and inoperative positions by means of suitable latch bolts carried on the frame and adapted to engage notched stops at the sides of the revolving head, the latch bolts being controlled manually by means of a suitable tripping device.

Another object is the provision of a rooting implement in which a simple screw and ratchet device associated with the conventional wheeled crank axle facilitates the manual control of the depth of penetration of the digging teeth.

A further object is the provision of a rooting implement in which the tool head carrying the rooting tools may be oscillated about its pivotal supports by means of hydraulic power to vary the angle of the rooting tools with respect to the ground surface.

Another object is the provision of a rooter in which the screw and ratchet device associated with the crank axle to control the depth of penetration may be substituted by a hydraulic cylinder with remote control without prohibitive installation expense.

As a further object, it provides a simple and compact yet substantial rooting implement for heavy duty in which the rotary head, upon releasing the latch bolts, revolves with the forward movement of the implement to bring the digging teeth out of the ground or out from under large roots, rocks or other obstructions.

With these and other objects in view the invention consists in the combination, correlation, and construction of parts, members, and features which will be described in the specification and will be finally pointed out in the claims.

Referring to the drawings:

Figure 1 is a plan view of a device embodying my invention.

Figure 2 is a side elevation of the device showing the inoperative position of the digging teeth.

Figure 3 is a fragmentary side elevation illustrating the digging teeth in the operative position.

Figure 4 is an enlarged detail of the mechanism for controlling the depth of operation.

Figure 5 is a section on line 5—5 of Figure 4.

Figure 6 is a side view of one of the digging teeth.

Figure 7:
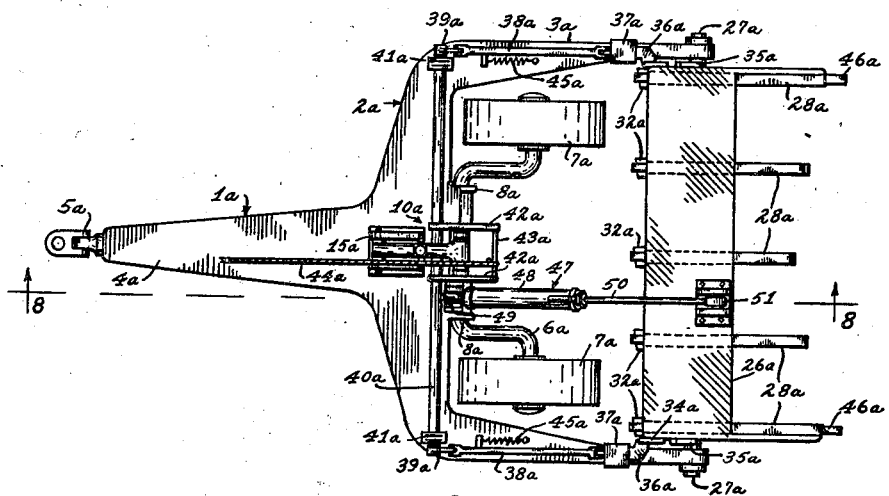
Figure 7 is a plan view of a modified form of the invention.

The objects outlined above are attained by the preferred and modified forms of embodiment of the invention shown in the drawings, which in a generic sense consists of a frame adapted for connection to a tractor, a wheeled crank axle pivotally secured to said frame, a screw jack device associated with the wheeled crank axle and the frame for controlling the depth of penetration of the implement, a tool head pivotally supported on said frame and digging tools or teeth removably carried in said tool head.

Referring to Figures 1 to 6 inclusive:

In a more specific sense, the preferred form of the improvement exemplified in the accompanying drawings in a practical form of embodiment, is shown as comprising a frame 1 which consists of a U-shaped portion 2 having the rearwardly extending side arms 3 and a forwardly extending draft tongue 4 adapted for connection to a tractor as at 5.

A crank axle 6, on which are journaled wheels 7 is pivotally mounted in bearings 8 which in turn are secured to the frame 1. Intermediate the ends of crank axle 6 and fixed thereto is a pair of upwardly extending levers 9. A ratchet screw jack device 10 comprising a threaded sleeve 11 pivotally interposed between the levers 9, as shown at 12, and a threaded sleeve 13 pivotally connected, as at 14, to bracket 15 which in turn is secured on frame 1. A screw 16 having right and left hand threads at the ends operatively engages the threaded portions of sleeves 11 and 13. A ratchet wheel 17 is secured to the screw 16 at a point intermediate the ends and a yoke 18 comprising a hub 19, carrying the handle 20, and a pair of depending arms 21, adapted to straddle the ratchet wheel 17, pivotally carried on the screw 16. Interposed between the arms 21 and pivotally secured thereto is a pawl 22 having fingers 23 and 24 adapted to engage notches 25 on the periphery of the ratchet wheel 17. It will be noted that the pawl 22 may be swung to either side of yoke 18 so that finger 23 or 24 may engage notches 25 on ratchet wheel 17 to rotate screw 16 in either direction for swinging the crank axle 6 up or down thereby lowering or raising the frame 1.

A tool head 26 is journaled in the ends of the rearwardly extending side arms 3 by virtue of the trunnions 27, and is adapted to carry ripping tools or teeth 28. Each ripping tool or tooth 28 is provided with a tongue 29 which slips into slots 30 in the tool head 26 and is held securely in place by means of a wedge 32 which engages the slot 33 at the end of tongue 29.

At the sides of the tool head 26 are notched stops 34 and 35 adapted to engage bolts 36 slidably carried in brackets 37 which in turn are secured to frame 1. The bolts 36 are connected by means of links 38 to the arms 39 at the ends of the transverse rock shaft 40 which in turn is pivotally supported in bearings 41 on frame 1. Interposed intermediate the ends of the rock shaft 40, and secured thereto, is a pair of spaced apart levers 42 conjoined at the ends by means of a rod 43 which has the actuating cable 44 attached thereto.

By pulling cable 44 the rock shaft 40 is actuated to release the bolts 36 out of engagement with the slotted stops 34 or 35. Springs 45 connected to the links 38 and frame 1 return the bolts 36 together with the releasing mechanism into the engaging position. It will be noted the stops 34 are positioned on the tool head 26 to hold in the operating position by engagement with bolts 36, as illustrated in Figure 3, and stops 35 are positioned to hold the tool head in the inoperative position as shown in Figure 2.

Upon releasing bolts 36 the ripping teeth 28 are removed from the operating position by the forward movement of the implement which in combination with the ground resistance on teeth 28 causes the tool head 26 to revolve forwardly about trunnions 27, thereby swinging the teeth up and out of the ground. As the tool head 26 revolves the bulk of the weight of same is shifted gradually forward of trunnions 27 thus when the points of teeth 28 are nearly out of the ground an overbalanced condition is reached which causes the tool head to fall in the position illustrated by the dotted lines in Figure 2. Further forward movement of the implement will cause the tool head to roll on the ground surface, the rolling movement being enhanced by the points 46.

Figure 8:
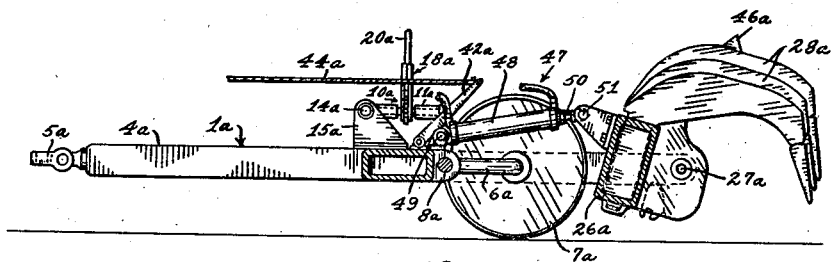
Figure 8 is a section on line 8—8 of Figure 7, illustrating the digger teeth in the inoperative position.
Figure 9:
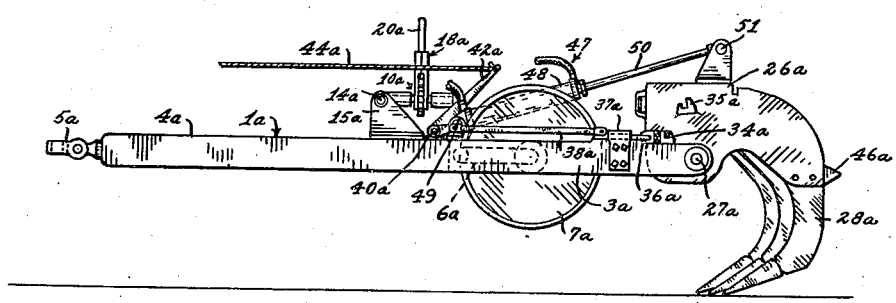
Figure 9 is a side elevation of the device showing the digger teeth in the operative position.

Referring to Figures 7 to 9 inclusive:

The modified form of the invention shown in these views consists of the addition of the hydraulic power unit 47 to the structure shown and described in the preferred form.

The hydraulic power unit 47 consists of cylinder 48 pivotally connected, as at 49, to the frame 1a, and piston rod 50 pivotally connected, as at 51, to the tool head 26a.

The hydraulic power unit 47 is used to control the angle of the digger teeth 28a with respect to the ground surface. It will be noted that in this instance the tool head 28a does not revolve about the trunnions 27a as does the tool head 28 of the preferred form, but simply oscillates to and from the operative and inoperative positions.

All parts corresponding to those of the preferred form are identified by the same reference numbers with the character "a" annexed.

Figure 10:
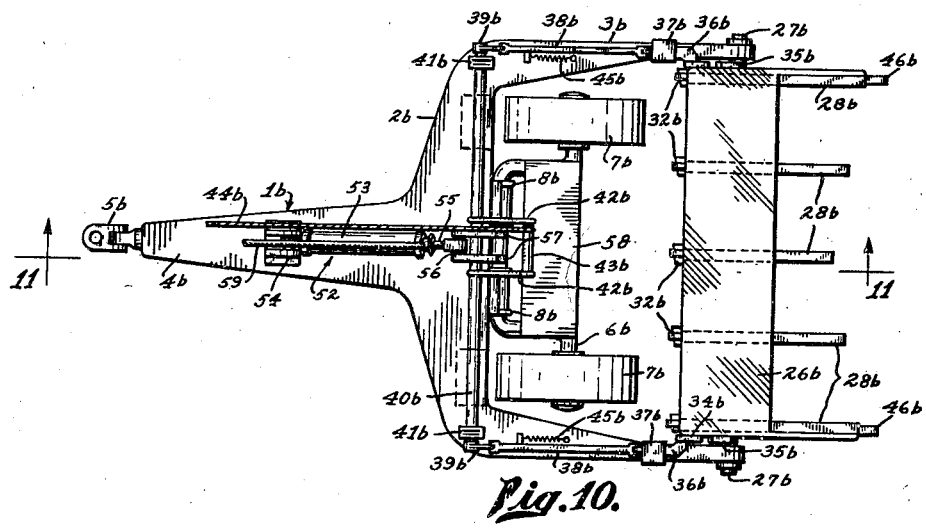
Figure 10 is a plan view of another modified form of the invention.
Figure 11:
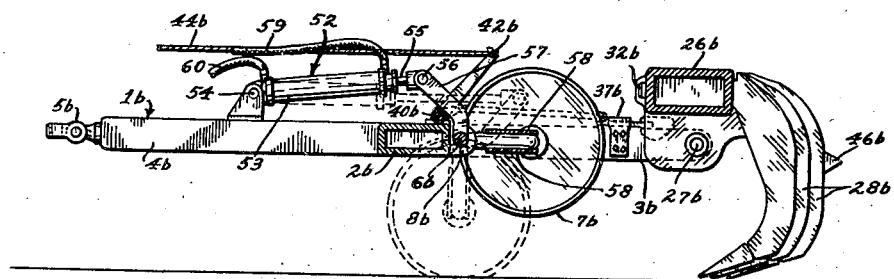
Figure 11 is a section on line 11—11 of Figure 10.
Figure 12:
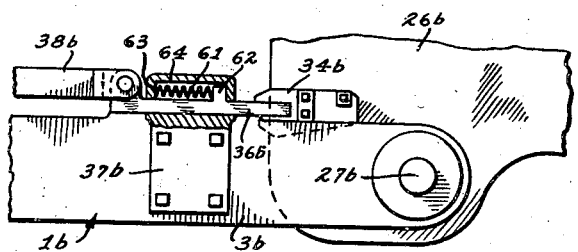
Figure 12 is a detail of a modified form of latch lock for the rotary tool head.

Referring to Figures 10 to 12 inclusive:

The modified form of the invention shown in these views consists in the substitution of the hydraulic power unit 52 for the ratchet screw jack device 10 of the preferred form.

The hydraulic power unit 52 consists of cylinder 53 pivotally connected, as at 54, to the frame 1b, and piston rod 55 pivotally connected, as at 56, to a pair of upwardly extending levers 57 which are located intermediate the ends and fixed to the crank axle 6b. The crank axle 6b may be strengthened, in heavy duty equipment, by means of the reinforcing plates 58.

The hydraulic power unit 52 may be controlled from the operator's station through fluid conduits 59 and 60.

The tension springs 45b between links 38b and frame 1b, for returning the bolts 36b into the engaging position, may be substituted by compression springs 61 housed within the bracket 37b and operatively interposed between the lugs 62 on bolts 36b and shoulder 63 of the pocket 64 in bracket 37b.

All parts corresponding to those of the preferred form are identified by the same reference numbers with the character "b" annexed.

Having thus described my invention, I claim:

1. A rooting device comprising a frame, means for connecting said frame to a tractor, a tool head pivotally carried in said frame, digging teeth projecting rearwardly and depending from said tool head, a wheeled crank axle pivotally mounted on said frame, screw jack means for actuating said crank axle to control the depth of operation locking means for holding said tool head in the operative and inoperative positions, means for releasing said locking means to permit said tool head to roll on the ground surface.

2. A rooting device comprising a frame, a revolvable tool head on said frame, removable digging teeth depending downwardly from the rear of said tool head, wheeled supports for said frame, means for actuating said tool head to control the depth of operation of the digging teeth.

3. A rooter comprising a frame, wheeled supports for said frame, means for actuating said wheeled supports to raise and lower said frame, a revolvable tool head carried on said frame, rooting tools on said tool head, latch bolts for holding said tool head in the operative and inoperative positions, means for releasing said latch bolts to permit the forward motion of the rooter to revolve said tool head bringing the rooting tools out of the ground.

4. A rooter comprising a frame, wheeled supports for said frame, means for actuating said wheeled supports to raise and lower said frame, a rollable tool head carried on said frame, rooting teeth on said tool head, latch bolts for holding said tool head in the operative and inoperative positions, means for releasing said latch bolts to permit the tool head to roll along the ground surface.

5. A rooter comprising a frame, a tool head pivotally carried on said frame, removable ripping tools in said tool head, releasable latch bolts for locking said tool head in the operative or inoperative positions, a wheeled crank axle pivotally mounted on said frame, screw jack means associated with said crank axle and said frame, manually controlled ratchet means for operating said screw jack to raise and lower said frame.

6. In a rooter the combination of a frame, a wheeled support for said frame, means for actuating said wheeled support to raise and lower said frame, a tool head pivotally carried on said frame, removable ripping teeth in said tool head, means associated with said tool head and said frame for controlling the angle of said ripping teeth with respect to the ground surface holding means for the operative and inoperative positions of said tool head, means for releasing said holding means to permit said tool head to roll on the ground surface.

7. A rooting device comprising a frame, a wheeled support for said frame, means for actuating said wheeled support to raise and lower said frame, a tool head pivotally carried on said frame, removable ripping tools in said tool head, a hydraulic power unit associated with said tool head and said frame for controlling the working angle of said ripping tools.

8. In a rooting device the combination of a frame, a rolling support for said frame, means for actuating said rolling support to raise and lower said frame, a tool head pivotally carried on said frame, rooting tools in said tool head, releasable means for locking said tool head in the extreme operative or inoperative positions, a hydraulic power unit associated with said tool head and said frame to selectively control the position of said tool head between the extreme operative and inoperative positions.

9. A rooting device comprising a frame, a wheeled support for said frame, hydraulic means for actuating said wheeled support to raise and lower said frame, a tool head revolvably carried on said frame, removable ripping tools in said tool head, releasable latch bolts for locking said tool head in the operative or inoperative positions.

10. In a rooting device the combination of a frame, a wheeled crank axle pivotally connected to said frame, hydraulic power means associated with said crank axle and said frame for actuating said crank axle to raise and lower said frame, a tool head rollably carried on said frame, rooting teeth in said tool head, latch bolts for holding said tool head in the operative or inoperative positions, means for releasing said latch bolts to permit the tool head to roll along the ground surface.

MAX M. BRODERSEN.